US008681896B1

(12) United States Patent
Chen et al.

(10) Patent No.: US 8,681,896 B1
(45) Date of Patent: Mar. 25, 2014

(54) TRANSMITTER I/Q AND CARRIER LEAK CALIBRATION

(75) Inventors: Chin-Hung Chen, Tainan (TW); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 12/779,595

(22) Filed: May 13, 2010

(51) Int. Cl.
*H04L 25/49* (2006.01)

(52) U.S. Cl.
USPC .......................... 375/296; 375/220; 375/285

(58) Field of Classification Search
USPC .......................................... 375/296, 220, 285
See application file for complete search history.

(56) References Cited

U.S. PATENT DOCUMENTS

| | | | |
|---|---|---|---|
| 7,003,263 B2 | 2/2006 | Fischer et al. | |
| 7,251,291 B1 * | 7/2007 | Dubuc et al. | 375/296 |
| 7,593,484 B2 * | 9/2009 | Beamish et al. | 375/296 |
| 2006/0141969 A1 | 6/2006 | Dubash et al. | |
| 2007/0153877 A1 | 7/2007 | Siwiak | |
| 2007/0189371 A1 | 8/2007 | Yen | |
| 2009/0034651 A1 * | 2/2009 | Lan et al. | 375/296 |
| 2010/0015936 A1 | 1/2010 | Mo et al. | |
| 2010/0066994 A1 | 3/2010 | Petrov et al. | |

OTHER PUBLICATIONS

"U.S. Appl. No. 12/562,997 Office Action", Dec. 20, 2011, 6 pages.
"U.S. Appl. No. 12/328,128 Office Action", Sep. 1, 2011, 19 pages.
U.S. Appl. No. 12/328,128, filed Dec. 4, 2008, Abdollahi Alibeik, Shahram et al.
U.S. Appl. No. 12/562,997, filed Sep. 18, 2009, Mack, Michael P.

Behzad, A. et al., "A Fully Integrated MIMO Multi-Band Direct-Conversion CMOS Transceiver for WLAN Applications (802.11n)", *International Solid-State Circuits Conference (ISSCC) 2007 Digest of Technical Papers* 2007, pp. 462-463, 765.
Behzad, A. et al., "A Fully Integrated MIMO Multi-Band Direct-Conversion CMOS Transceiver for WLAN Applications (802.11n)", *International Solid-State Circuits Conference (ISSCC) 2007 Digest of Technical Papers* Feb. 2007, pp. 560-561, 622.
Craninckx, J. et al., "A WLAN direct up-conversion mixer with automatic image rejection calibration", *Solid-State Circuits Conference, 2005. Digest of Technical Papers. ISSCC. 2005 IEEE International* Feb. 2005, pp. 546-547, 616.
Hsieh, Yong-Hsiang et al., "An auto-I/Q calibrated CMOS transceiver for 802.11g", *Solid-State Circuits, IEEE Journal* 2005, pp. 92-93.
"U.S. Appl. No. 12/328,128 Final Office Action", Jan. 26, 2012, 23 pages.

\* cited by examiner

*Primary Examiner* — Sam K Ahn
*Assistant Examiner* — Janice Tieu
(74) *Attorney, Agent, or Firm* — DeLizio Gilliam, PLLC

(57) ABSTRACT

Joint transmit error (i.e., carrier leak and I/Q mismatch) calibration can be implemented in a transmitter unit in a wireless device. DC signals can be superposed onto digital complex tone signals to generate calibration signals for joint transmit error calibration. The calibration signals may also be phase shifted and/or pre-distorted with digital I/Q phase to yield distinct calibration measurements that can be used for joint transmit error calibration. Digital scaling can be applied at the transmitter unit in accordance with a transmitter gain setting to maintain a constant receiver gain setting. At a receiver unit of the wireless device, the DC signals can be separated from the digital complex tone signals for transmit error calibration. Such a joint transmit error calibration can minimize calibration time, reduce the number of computations required for transmit error calibration, improve the accuracy of the transmit error calibration, and improve performance of the wireless device.

27 Claims, 5 Drawing Sheets

TRANSMITTER I/Q AND CARRIER LEAK CALIBRATION

BACKGROUND

Embodiments of the inventive subject matter generally relate to the field of wireless communication and, more particularly, to techniques for transmitter I/Q and carrier leak calibration.

In wireless communication devices, such as wireless local area network (WLAN) devices, various signal impairments can affect the quality of transmitted and received wireless signals. For example, amplitude and phase mismatch in in-phase and quadrature-phase signal components ("I/Q mismatch") at a transmitter and a receiver can result in unwanted spectral components and inter-channel interference (ICI), which can consequently degrade error vector measurements. As another example, a DC offset in the transmitting device (also known as carrier leak) may result in performance degradation.

SUMMARY

Various embodiments for joint transmitter I/Q and carrier leak calibration are disclosed. In one embodiment, a plurality of digital complex tone signals and a plurality of DC signals are generated at a transmitter unit of a wireless network device. The plurality of digital complex tone signals are combined with the plurality of DC signals to generate a plurality of calibration signals used for performing transmitter I/Q mismatch and carrier leak calibration in the wireless network device. A predefined digital I/Q phase mismatch is applied to one or more of the plurality of calibration signals. An analog phase shift is applied to one or more of the plurality of calibration signals. The plurality of calibration signals are provided from the transmitter unit to a receiver unit of the wireless network device via a loopback path coupled between the transmitter unit and the receiver unit. The plurality of calibration signals are processed to determine transmitter I/Q mismatch and carrier leak parameters for the transmitter unit. The transmitter unit is programmed to compensate for transmitter I/Q mismatch and carrier leak based on the transmitter I/Q mismatch and carrier leak parameters.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
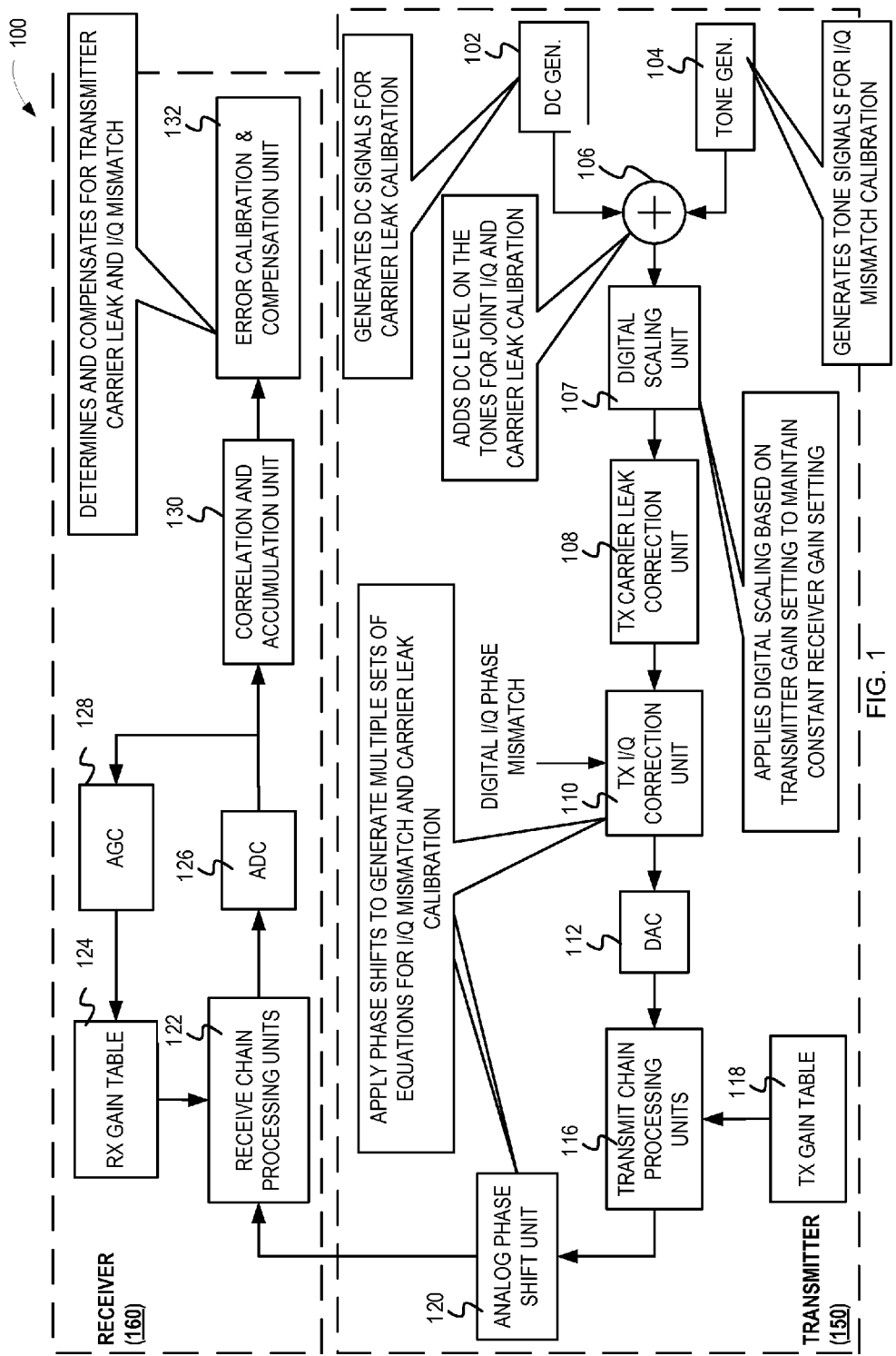
FIG. 1 illustrates an example block diagram of a transceiver comprising mechanism for joint transmitter I/Q mismatch and carrier leak calibration.

The description that follows includes exemplary systems, methods, techniques, instruction sequences, and computer program products that embody techniques of the present inventive subject matter. However, it is understood that the described embodiments may be practiced without these specific details. For instance, although examples refer to joint transmitter I/Q mismatch and carrier leak calibration in wireless local area network (WLAN) devices, in other implementations, joint transmitter I/Q mismatch and carrier leak calibration may be implemented on other wireless standards and devices, e.g., Bluetooth®, WiMAX, ZigBee®, Wireless USB devices, etc. In other instances, well-known instruction instances, protocols, structures, and techniques have not been shown in detail in order not to obfuscate the description.

The accuracy of carrier leak calibration is closely linked to the accuracy of I/Q mismatch calibration. Carrier leak is usually estimated by transmitting DC signals through a loop-back circuit connecting the transmitter and receiver of a wireless network device, while the I/Q mismatch is estimated by transmitting digital complex tone signals through the loop-back circuit. Typically, the carrier leak calibration and the I/Q mismatch calibration are performed separately. For example, the I/Q mismatch may be calibrated first, and the carrier leak may then be calibrated based on the I/Q mismatch calibration. In some instances, however, the residual error may not lie within acceptable limits and therefore require that both carrier leak calibration and I/Q mismatch calibration be performed iteratively. Moreover, separate carrier leak calibration and I/Q mismatch calibration can involve a large number of calibration measurements and calculations. Each calibration measurement typically involves sizing a calibration signal (i.e., the DC signal or the digital complex tone signal) accurately, adjusting transmitter gain settings and receiver gain settings to ensure proper reception of the calibration signal, etc. In other words, calibrating the carrier leak and the I/Q mismatch separately can be a time intensive and computationally intensive task.

Functionality can be implemented for joint calibration of the carrier leak and the I/Q mismatch by transmitting a single set of calibration signals through the loopback circuit of a wireless network device. In one embodiment, an error calibration unit can perform joint carrier leak and I/Q mismatch calibrations by superposing DC signals (used in carrier leak calibration) on digital complex tone signals (used in I/Q mismatch calibration). At the receiver, the DC signals can be separated from the digital complex tone signals so that the I/Q mismatch and carrier leak can be calibrated. The transmitter I/Q mismatch and carrier leak can also be corrected at the transmitter prior to data transmission to reduce the impact of I/Q mismatch and carrier leak. Using a common set of calibration signals for carrier leak and I/Q mismatch calibrations, can reduce the number of calibration signals required for carrier leak and I/Q mismatch and can result in accurate calibration of the I/Q mismatch and carrier leak, improve performance, and minimize calibration time.

Moreover, I/Q mismatch typically varies for different transmitter gain settings and, therefore, may be calibrated for all unique transmitter gain settings. However, a variation in the transmitter gain settings can also result in a variation in the receiver gain settings. Functionality can be implemented to apply digital scaling in accordance with the transmitter gain setting, prior to digital to analog converter (DAC) processing, to maintain a constant receiver gain setting and to maintain a constant amplitude of a received calibration signal. This can preclude the need for calibrating impairments that depend on receiver gain (e.g., receiver DC offset) at each receiver gain setting, thus minimizing calibration time. This can also minimize saturation in a receive mixer by helping to ensure that the input to the receive mixer is below the mixer's compression point.

FIG. 1 illustrates an example block diagram of a transceiver comprising a mechanism for joint transmitter I/Q and carrier leak calibration. In one embodiment, the transceiver 100 may be included within a wireless communication device, such as a WLAN device. As illustrated, the transceiver 100 comprises a transmitter 150 and a receiver 160. The transmitter 150 and the receiver 160 are coupled via a loopback path in an analog front end of the transceiver 100. The loopback path may be utilized during a calibration mode of the transceiver 100 to perform joint transmitter I/Q mismatch and carrier leak calibration operations. In one embodiment, the transmitter 150 comprises a DC generator 102, a tone generator 104, an adder 106, a digital scaling unit 107, a transmit carrier leak correction unit 108, a transmit I/Q correction unit 110, a digital-to-analog converter (DAC) 112, transmit chain processing units 116, a transmit gain table 118, and an analog phase shift unit 120. In one embodiment, the receiver 160 comprises receive chain processing units 122, a receive gain table 124, an analog to digital converter (ADC) 126, an automatic gain control unit (AGC) 128, a correlation and accumulation unit 130, and an error calibration and compensation unit 132.

During operation, in some embodiments, the DC generator 102 and the tone generator 104 generate signals that are provided as inputs to the adder 106. The output of the adder 106 is provided to the digital scaling unit 107. The digital scaling unit 107 is coupled to the transmit carrier leak correction unit 108 which, in turn, is coupled to the transmit I/Q correction unit 110. In the transmit I/Q correction unit 110, a digital I/Q phase mismatch is applied (if necessary) to the signals. The signal at the output of the transmit I/Q correction unit 110 is processed by the DAC 112 and by the transmit chain processing units 116. The gain of the transmit chain processing units 116 is controlled based on transmitter gain settings in the transmit gain table 118. A signal at the output of the transmit chain processing units 116 is then phase shifted (if required) by the analog phase shift unit 120. After the signals pass through the loopback path, the receive chain processing units 122 receive the signals ("received loopback signals"). The received loopback signals are processed by the receive chain processing units 122 and are provided to the ADC 126. The ADC 126 is coupled to the AGC 128 to determine a proper setting in the receive gain table 124 for the receive chain processing units 122. The ADC 126 is also coupled to the correlation and accumulation unit 130. The correlation and accumulation unit 130 is further coupled to the error calibration and compensation unit 132.

In one implementation, the transmitter 150 may be connected to the receiver 160 (in the loopback path) via a loopback switch. In one implementation, the error calibration and compensation unit 132 may generate control signals to couple the transmitter 150 to the receiver 160 for error calibration (e.g., by closing the loopback switch), to enable the transmit I/Q correction unit 110 and the analog phase shift unit 120 in the loopback path, etc. during a calibration mode. The error calibration and compensation unit 132 may also generate control signals to decouple the transmitter 150 from the receiver 160, to disable the transmit I/Q correction unit 110 and the analog phase shift unit 120 in the transmitter 150, etc. during normal operations. In other implementations, however, other components implemented in hardware or software may control the mode of operation (calibration mode or normal operation mode) of the transceiver 100.

The DC generator 102 generates one or more DC signals that are transmitted through the loopback path for carrier leak calibration. The tone generator 104 generates one or more digital complex tone signals, a specific frequency, which is transmitted through the loopback path for transmitter I/Q mismatch calibration. In some embodiments, the DC signals generated by DC generator 102 and the digital complex tone signals generated by tone generator 104 are provided as inputs to the adder 106. The adder 106 superposes the DC signals on in-phase signal components of the digital complex tone signals. Superposing the DC signal on the digital complex tone signal facilitates joint I/Q mismatch and carrier leak calibration. In one implementation, the DC generator 102 may generate two DC signals and the tone generator 104 may generate four digital complex tone signals. Each of the two DC signals may be superposed on two of the four digital complex tone signals, as will be further described below. Two of the calibration signals at the output of the adder 106 are digital complex tone signals without superposed DC signals and the other two calibration signals comprise a DC signal superposed on the digital complex tone signal. The calibration signals are provided to the digital scaling unit 107. The digital scaling unit 107 varies digital transmitter gain (via digital scaling) based on the transmitter gain setting to ensure a constant power of the received loopback signal. If the transmitter carrier leak is known, the transmit carrier leak correction unit 108 corrects the carrier leak. During a calibration mode, however, when the carrier leak is unknown, the transmit carrier leak correction unit 108 may be disabled or may be configured to not apply any corrections to the calibration signals. The transmit I/Q correction unit 110 determines whether a digital I/Q phase mismatch ($\Delta\theta_T$) should be applied to one or more of the calibration signals. Applying the digital I/Q phase mismatch enables generation of multiple sets of calibration signals to facilitate joint transmitter I/Q mismatch and carrier leak calibration. Depending on whether or not the digital I/Q phase mismatch should be applied to the calibration signals, the transmit I/Q correction unit 110 may or may not apply the digital I/Q phase mismatch to the calibration signals. For example, the transmit I/Q correction unit 110 may determine and apply a digital I/Q phase mismatch to a first calibration signal. The transmit I/Q correction unit 110 may not apply the digital I/Q phase mismatch to a second calibration signal to yield two distinct signals. The DAC 112 receives the calibration signals and converts the calibration signals into their analog representation. The output of the DAC 112 is provided to the transmit chain processing units 116. The transmit chain processing units 116 can comprise mixer stage(s), a BiQuad filter, other filter stage(s), etc. The gain of the transmitting chain processing units 116 can be varied in accordance with a current transmitter gain setting. Additionally, the analog phase shift unit 120 may also introduce an analog phase shift ($\phi_{shift}$) into one or more of the calibration signals to generate multiple sets of distinct equations for joint transmitter I/Q mismatch and carrier leak calibration.

The calibration signal is passed through the loopback path and is received ("received loopback signal") by the receive chain processing units 122. The receive chain processing units 122 can comprise mixer stage(s), filter stage(s), etc. The receive gain table 124 comprises receiver gain settings that control gain of the receive chain processing units 122. Typically, the gain of the receive chain processing units 122 is set before calibration measurements are performed and the receiver gain settings are kept constant across the calibration measurements for each transmitter gain setting and across the transmitter gain settings. In some implementations, instead of varying the receiver gain setting, the transmitter gain settings and the strength of a transmitted signal (e.g., a gain applied to the transmitted signal, a DAC gain, etc.) may be varied to ensure a constant receiver gain setting. After the received loopback signal is processed by the receive chain processing units 122, the ADC 126 converts the received loopback signal into its digital representation. The AGC 128 analyses the digitized received loopback signal to ensure that the current receiver gain setting is appropriate for receiving the received loopback signal and for decoding the received loopback signal. If the AGC 128 determines that the current receiver gain setting should be changed, the gain of the receive chain processing units 122 is accordingly set to a new receiver gain setting. Moreover, the AGC 128 may also indicate that all previous calibration measurements for the transmitter gain setting should be discarded and that a new set of calibration measurements should be performed for the transmitter gain setting. If the AGC 128 determines that the current receiver gain setting should not be changed, the correlation and accumulation unit 130 corrects I/Q imbalances in the received loopback signal. The AGC 128 also calculates a mean power of the received loopback signal. The AGC 128 compares the mean power against power thresholds to determine whether the digital scaling unit 107 should increase or decrease a current digital scaling or whether the receiver gain setting should be varied. The correlation and accumulation unit 130 may discard all previous calibration signals for the transmitter gain setting if it is determined that the digital scaling and/or the receiver gain setting should be changed. Accordingly, a new set of calibration signals for the transmitter gain setting may be provided to the error calibration and compensation unit 132. The correlation and accumulation unit 130 can process the received loopback signal to extract a received digital complex tone signal and a received DC signal. The correlation and accumulation unit 130 can comprise an I/Q correlator to process the I-signal and Q-signal components of the extracted digital complex signal and provide the processed results to the error calibration and compensation unit 132.

The correlation and accumulation unit 130 calculates the power of the I-signal and Q-signal components and the correlation between the I-signal and the Q-signal components from multiple calibration signals (e.g., four calibration signals for each transmitter gain setting). The error calibration and compensation unit 132 determines transmitter I/Q mismatch and carrier leak parameters based on the results from the correlation and accumulation unit 130 as will be further described below with reference to FIGS. 2-4. The error calibration and compensation unit 132 can combine a magnitude of the I-signal component, magnitude of the Q-signal component, and a product of the I-signal component and the Q-signal component calculated for each of the multiple calibration measurements, to determine corrections to compensate for the transmitter I/Q mismatch. The error calibration and compensation unit 132 can program the transmitter 150 to compensate for the transmitter I/Q mismatch and carrier leak in accordance with the transmitter I/Q mismatch and carrier leak parameters during normal transmission operations. For example, the error calibration and compensation unit 132 may store the transmitter I/Q mismatch and carrier leak associated with each transmitter gain setting. As another example, the error calibration and compensation unit 132 can direct appropriate processing units in the transmitter 150 to apply corrections during normal transmission operations to compensate for transmitter I/Q mismatch and carrier leak. The error calibration and compensation unit 132 may generate control signals, indicating the transmitter I/Q mismatch and carrier leak parameters, to one or more processing components in the transmitter 150 (e.g., the transmit I/Q correction unit 110, the transmit carrier leak correction unit 108, the digital scaling unit 107, etc.). The processing components in the transmitter 150 may pre-distort the signals to be transmitted to compensate for the transmitter I/Q mismatch and carrier leak. Although not depicted in FIG. 1, in some implementations, the error calibration and compensation unit 132 may also comprise a pre-distortion unit configured to pre-distort signals that are processed by the transmitter unit 150 in accordance with the calibrated transmitter I/Q mismatch and carrier leak parameters.

It should be noted that the components described with reference to FIG. 1 are meant to be exemplary, and are not intended to limit the inventive subject matter to any specific set of components or configurations. For example, in various embodiments, one or more of the components described may be omitted, combined, modified, or additional components included, as desired. For instance, in some embodiments, the transmitter 150 and the receiver 160 in the transceiver 100 may share a common antenna, or may have various additional antennas and transmitter/receiver chains. In some implementations, the transceiver 100 may include less or more filters and/or amplifier circuitry. For example, the transmitter 150 and the receiver 160 may include one or more variable gain amplifiers (VGAs), etc. During normal operations, the AGC 128 may control the receiver gain setting and the gain applied to the receive chain processing units 122. Moreover, although FIG. 1 depicts the error calibration and compensation unit 132 as residing in the receiver 160, in some implementations, the error calibration and compensation unit 132 may comprise hardware and software that resides in the transmitter 150, in both the receiver 160 and the transmitter 150, and/or within other processing components of the transceiver 100.

Figure 2:
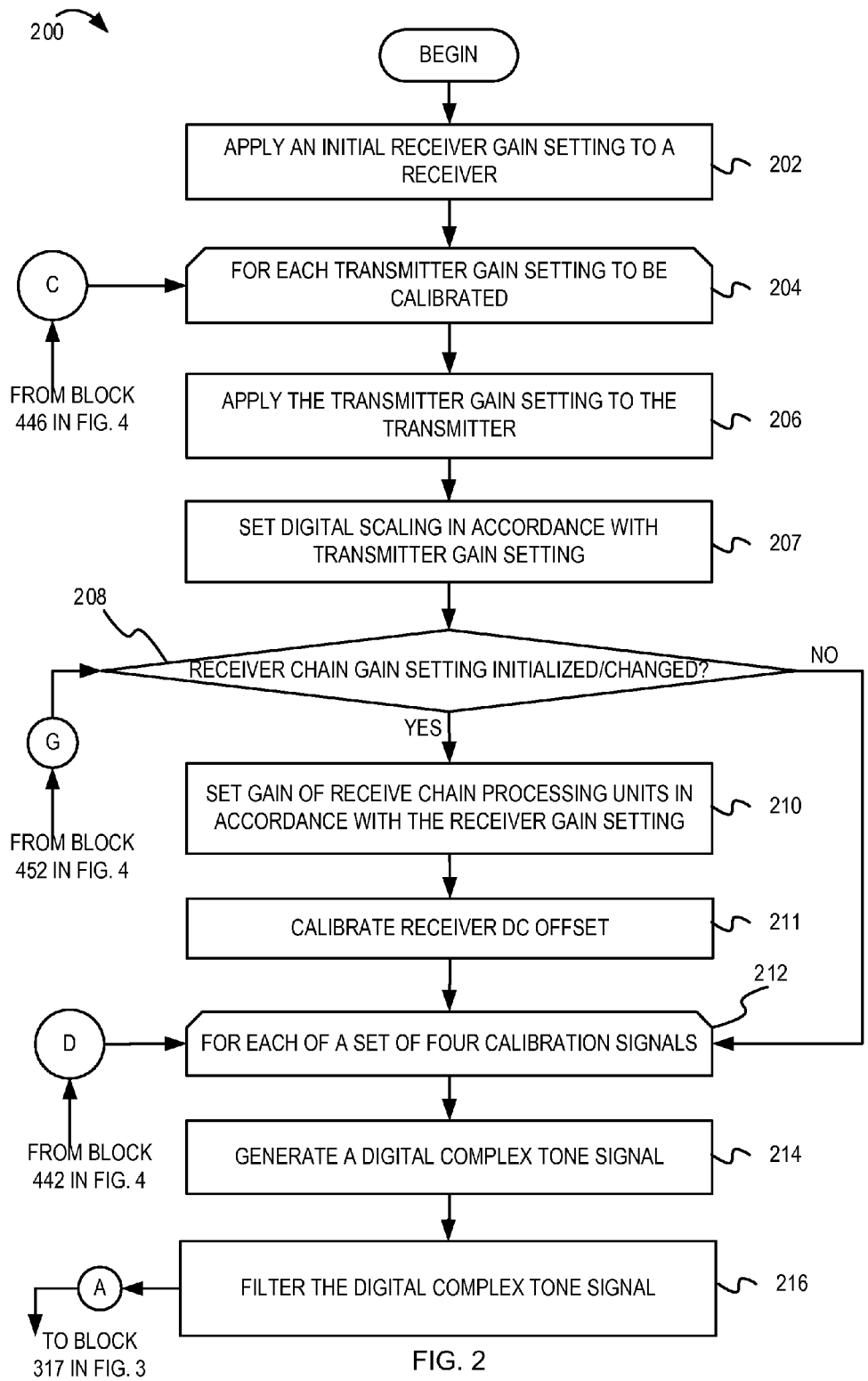
FIG. 2 depicts a flow diagram illustrating example operations for joint transmitter I/Q and carrier leak calibration.
Figure 3:
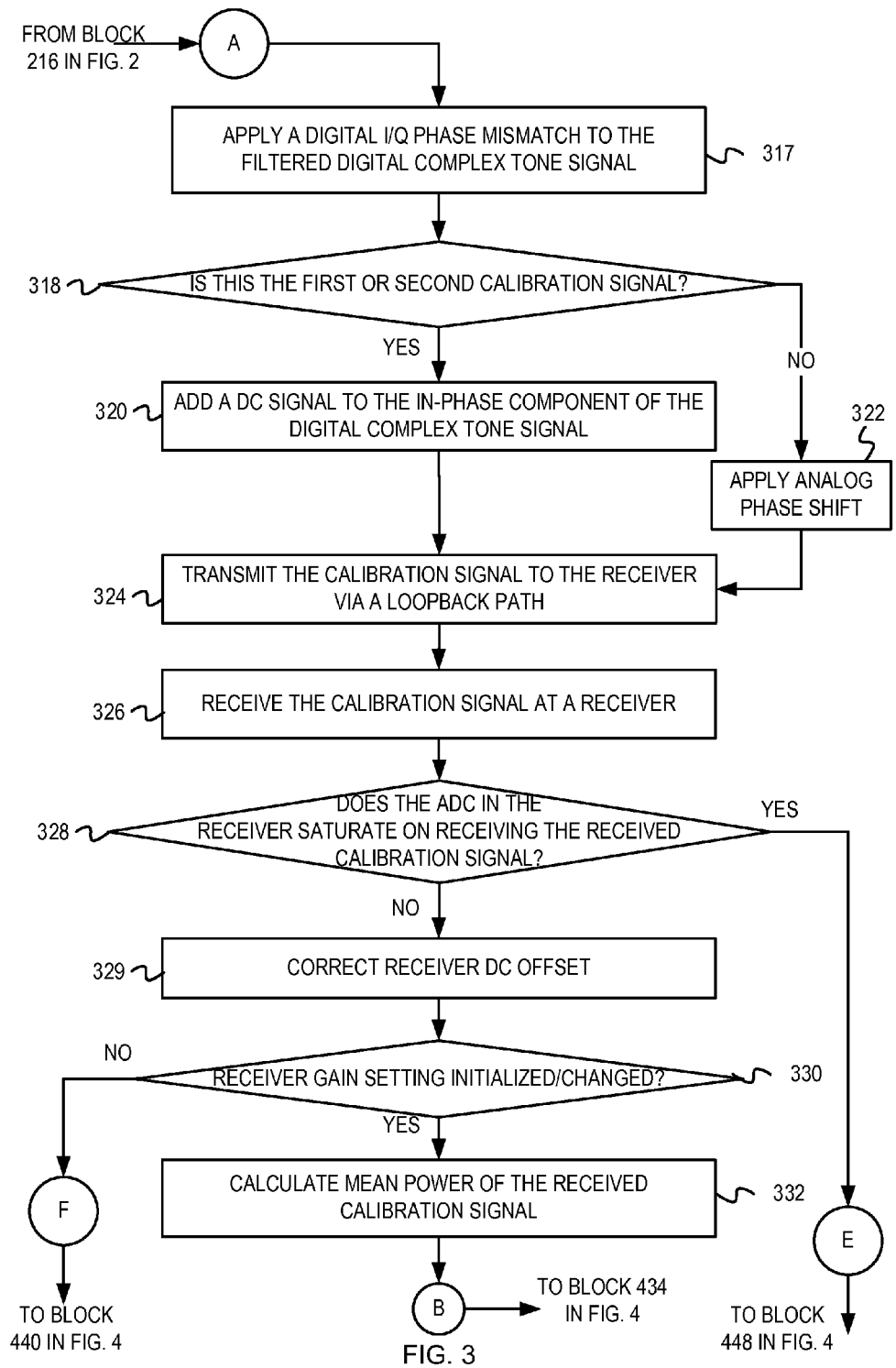
FIG. 3 depicts the flow diagram illustrating example operations for joint transmitter I/Q and carrier leak calibration.
Figure 4:
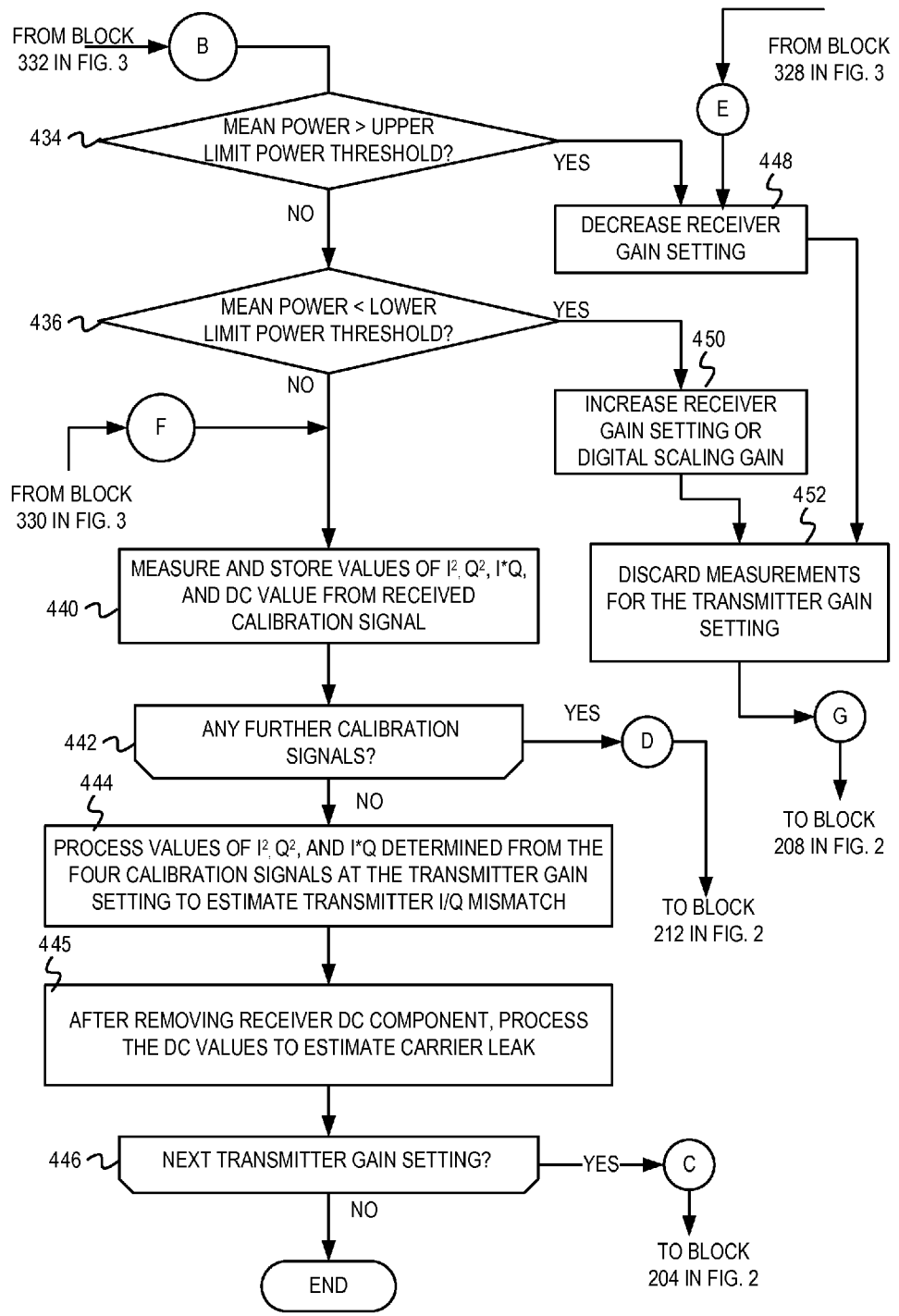
FIG. 4 depicts the flow diagram illustrating example operations for joint transmitter I/Q and carrier leak calibration.

FIG. 2, FIG. 3, and FIG. 4 depict a flow diagram illustrating example operations for joint transmitter I/Q and carrier leak calibration in a wireless communication device. Flow 200 begins at block 202 in FIG. 2.

At block 202, an initial receiver gain setting is applied to a receiver. For example, the initial receiver gain setting is applied to receive chain processing units 122 of the receiver 160 shown in FIG. 1. In some implementations, prior to initiating operations for joint transmitter I/Q mismatch and carrier leak calibration ("joint transmitter error calibration"), the receiver gain setting may be adjusted so that a signal received by the receiver 160 is at a desired amplitude level. The receiver gain setting may be selected from a list of available receiver gain settings and may be determined based on a requisite strength of the received signal. For example, the receiver gain setting may be selected from the receive gain table 124 and gain of the receive chain processing units 122 (e.g., mixer(s), filter(s), and other baseband components) may be varied so that a received loopback signal is at the desired amplitude level. In one implementation, receive impairments for only the current receiver gain setting may be calibrated. The error calibration and compensation unit 132 may generate control signals directing the transmit carrier leak correction unit 108 and/or the transmit I/Q correction unit 110 to correct the transmit I/Q mismatch and carrier leak. The flow continues at block 204.

At block 204, a loop begins for each transmitter gain setting to be calibrated. For example, a transmit gain table 118 may be accessed to determine the transmitter gain setting to be calibrated and to accordingly vary gain of the transmit chain processing units 116. In one example, the transmitter gain setting may indicate a combination of transmit mixer gain and transmit Biquad LPF gain. The transmitter I/Q mismatch and carrier leak are typically dependent on the transmitter gain setting and are, therefore, calibrated for each available transmitter gain setting in the transmit gain table 118. The flow continues at block 206.

At block 206, the transmitter gain setting is applied to the transmitter. For example, the gain of the transmit chain processing units 116 may be varied in accordance with the transmitter gain setting. Coefficients of the transmit chain processing units 116 (e.g., filter stage(s), mixer stage(s), etc.) may be varied in accordance with the transmitter gain setting. The flow continues at block 207.

At block 207, digital scaling is applied in accordance with the transmitter gain setting. For example, the digital scaling unit 107 may scale the transmitter digital gain (prior to processing by the DAC 112) based, at least in part, on the transmitter gain setting and the receiver gain setting. For example, the digital scaling unit 107 may apply digital scaling, based on the transmitter gain setting, to maintain a relatively constant received signal strength such that a receiver gain setting can be maintained at a constant setting. In other words, for a high transmitter gain setting, the digital scaling unit 107 may apply a low digital gain. Likewise, for a low transmitter gain setting, the digital scaling unit 107 may apply a high digital gain. The flow continues at block 208.

At block 208, it is determined whether the receiver gain setting has changed or been initialized. In some implementations, the AGC 128 may determine whether the receiver gain setting has changed or been initialized. Digital scaling may be applied in conjunction with the transmitter gain setting so that the received signal does not saturate an ADC 126 or is not too small to be detected. However, in some implementations, adjusting the gain of the transmit chain processing units 116 and/or applying the digital scaling, can result in the strength of the received signal deviating from the requisite strength of the received signal. Therefore, the receiver gain setting may be varied so that the strength of the received signal is approximately equal to the requisite strength of the received signal. In determining whether the receiver gain setting should be varied, it may be determined whether varying the gain of the transmit chain processing units 116, and/or applying the digital scaling in accordance with the transmitter gain setting causes a variation in the receiver chain gain setting. For example, it may be determined that decreasing the digital scaling gain in accordance with an increased transmitter gain results in ADC saturation at the receiver 160. Thus, the receiver gain setting may be decreased. As another example, it may be determined that increasing the digital scaling gain in accordance with a reduced transmitter gain results in a low signal strength at the receiver 160. Thus, the receiver gain setting may be increased. If it is determined that the receiver gain setting should be varied, the flow continues at block 210. Otherwise, the flow continues at block 212.

At block 210, the gain of the receive chain processing units is set in accordance with the receiver gain setting. In response to determining that the receiver gain setting should be changed, a new receiver gain setting may be determined and the gain of the receive chain processing units 122 may be accordingly adjusted. For example, the AGC 128 may determine that the receiver gain setting should be changed and may indicate that the gain of the receive chain processing units 122 should be accordingly adjusted. The receive impairments may also be calibrated for the new receiver gain setting. The flow continues at block 211.

At block 211, a DC offset of the receiver is calibrated. The DC offset of the receiver may be calibrated so that the receiver DC offset can be removed from signals received at the receiver 160. The flow continues at block 212.

At block 212, a loop begins for each calibration signal in a set of four calibration signals. For each transmitter gain setting, the set of four calibration signals can be used to calibrate the transmitter I/Q mismatch and carrier leak, as will be described further below. It should be noted that in other implementations, other suitable number of calibration signals could be used to calibrate the transmitter I/Q mismatch and carrier leak. The flow continues at block 214.

At block 214, a digital complex tone signal is generated. For example, the tone generator 102 generates the digital complex tone signal that has orthogonal in-phase signal I-signal and quadrature signal (Q-signal) components. In some embodiments, the digital complex tone signal may be scaled so that the amplitude of the digital complex tone signal is equal to a predetermined tone amplitude. The predetermined tone amplitude may be determined based on the transmitter gain setting. In some embodiments, the power of the digital complex tone signal may be set based on the applied digital scaling. The flow continues at block 216.

At block 216, the digital complex tone signal is filtered. The digital complex tone signal may be upsampled or downsampled and/or filtered to match a clock rate. The flow continues at block 317 in FIG. 3.

At block 317, a digital I/Q phase mismatch is applied to the filtered digital complex tone signal. For example, the transmit I/Q correction unit 110 applies the digital I/Q phase mismatch. The digital I/Q phase mismatch ($\Delta\theta_T$) is a known I/Q mismatch that may be applied to one or more of four calibration signals to generate multiple sets of equations to estimate transmitter I/Q mismatch and carrier leak. Different values of digital I/Q phase mismatch may be applied to each filtered digital complex tone signal generated for each of the four calibration measurements. In one implementation, depending on whether or not the digital I/Q phase mismatch should be applied to the calibration signal, the transmit I/Q correction unit 110 may or may not be enabled. The transmit I/Q correction unit 110 may accordingly apply the digital I/Q phase mismatch to purposely distort the calibration signal. In one implementation, a 4-degree digital I/Q phase mismatch may be applied to two of the four filtered digital complex tone signals; while a digital I/Q phase mismatch may not be applied to the other two of the four filtered digital complex tone signals. In another implementation, other suitable values of digital I/Q phase mismatch may be applied to the filtered digital complex tone signals. The flow continues at block 318.

At block 318, it is determined whether the calibration signal is a first or a second calibration signal. For joint transmitter error calibration, a DC signal is superposed on the digital complex tone signal generated for the first and second calibration signals. Two digital complex tone signals generated for I/Q mismatch calibration are merged with two DC signals generated for carrier leak calibration so that carrier leak calibration and I/Q mismatch calibration can be performed simultaneously. It should be noted that, in some implementations, the DC signal may not be superposed on only the digital complex tone signal for the first and the second calibration signals. In some implementations, the DC signal may be superposed on digital complex tone signals for any two calibration signals. For example, the DC signal may be superposed on digital complex tone signals for a third and a fourth calibration signals. If it is determined that the calibration signal is the first or the second calibration signal, the flow continues at block 320. Otherwise, the flow continues at block 322.

At block 322, an analog phase shift is applied to the calibration signal. For example, the analog phase shift unit 120 applies the analog phase shift ($\phi_{shift}$) to the calibration signal.

The analog phase shift is an arbitrary and unknown phase shift that can be applied in the loopback path to help generate the set of four distinct equations. The set of four distinct equations can be solved to estimate the transmitter I/Q mismatch and carrier leak based on measurements of the four calibration signals. For example, the analog phase shift unit 120 may comprise a switch to connect the analog phase shift unit 120 to the transmitter 150. Depending on whether or not the analog phase shift should be applied, the switch may be controlled (e.g., by the error calibration and compensation unit 132) to connect the analog phase shift unit 120 to the transmitter 150. It should be noted, however, that the analog phase shift can be applied by other methods, e.g., the analog phase shift unit 120 can be activated and deactivated as necessary to apply the analog phase shift.

In some implementations, the analog phase shift ($\phi_{shift}$) and the digital I/Q phase mismatch ($\Delta\theta_T$) may be applied to each of the four calibration measurements such that, 1) neither digital I/Q phase mismatch nor analog phase shift are applied in the calibration signal for the first calibration measurement, 2) digital I/Q phase mismatch is applied and analog phase shift is not applied in the calibration signal for the second calibration measurement, 3) digital I/Q phase mismatch is not applied and analog phase shift is applied in the calibration signal for the third calibration measurement, and 4) both digital I/Q phase mismatch and analog phase shift are applied in the calibration signal for the fourth calibration measurement. Applying the analog phase shift and the digital I/Q phase mismatch as described above can, in one implementation, result in a set of four equations that can be solved to determine the transmitter I/Q mismatch. In one implementation, the analog phase shift may be 60 degrees. In another implementation, other suitable values of analog phase shift may be applied to the calibration signals. Moreover, as depicted in FIG. 3, in one implementation, the analog phase shift may be applied to the calibration signals that do not comprise a superposed DC signal (for carrier leak calibration). It is noted, however, that in other embodiments the analog phase shift may be applied to others of the four calibration signals. The flow continues at block 324.

At block 320, the DC signal is added to the I-signal component of the digital complex tone signal. For example, the tone generator 102 (or the error calibration and compensation unit 132) may generate a control signal that directs the adder 106 to add the DC signal to the I-signal component of the digital complex tone signal. The adder 106 may superpose the DC signal generated by a DC generator 104 onto the digital complex tone signal. In one implementation, for the first calibration signal, the adder 106 may superpose a positive DC signal on the I-signal component of the digital complex tone signal. For the second calibration measurement, the adder 106 may superpose a negative DC signal on the I-signal component of the digital complex tone signal. The adder 106 may not superpose the DC signal on the Q-signal component of the digital complex tone signal. In another implementation, the adder 106 may superpose the DC signal on the Q-signal component of the digital complex tone signal as well. In one implementation, the amplitude of the DC signal may be equal to the amplitude of the digital complex tone signal. In another implementation, the amplitude of the DC signal may be other suitable amplitude. The flow continues at block 324.

At block 324, the calibration signal is transmitted to the receiver via the loopback path. In one implementation, the I-signal and the Q-signal components may be provided to the DAC 112 (or to two separate DACs), the I-signal component and the Q-signal component may be up-sampled, etc. In addition, the I-signal component and the Q-signal component may also be filtered, amplified, modulated on to carriers (i.e., in-phase and quadrature carriers respectively), and multiplexed to generate an RF calibration signal to be transmitted. In some implementations, the amplitude of the calibration signal may be varied so that a product of the amplitude of the calibration signal and the transmitter gain remains constant at the receiver 160. The flow continues at block 326.

At block 326, the calibration signal is received at the receiver via the loopback path. For example, the receive chain processing units 122 may receive the calibration signal ("received calibration signal"). The receive chain processing units 122 may comprise filter stage(s), mixer stage(s), etc. In one implementation, Eq. 1 can represent the received calibration signal.

$$\begin{bmatrix} Ri \\ Rq \end{bmatrix} = G \begin{bmatrix} (1+\frac{\varepsilon_r}{2})\cos(\frac{\theta_r}{2}) & (1+\frac{\varepsilon_r}{2})\sin(\frac{\theta_r}{2}) \\ (1-\frac{\varepsilon_r}{2})\sin(\frac{\theta_r}{2}) & (1-\frac{\varepsilon_r}{2})\cos(\frac{\theta_r}{2}) \end{bmatrix} \begin{bmatrix} \cos\varphi & -\sin\varphi \\ \sin\varphi & \cos\varphi \end{bmatrix} \quad \text{Eq. 1}$$

$$\begin{bmatrix} (1+\frac{\varepsilon_t}{2})\cos(\frac{\theta_t}{2}) & (1+\frac{\varepsilon_t}{2})\sin(\frac{\theta_t}{2}) \\ (1-\frac{\varepsilon_t}{2})\sin(\frac{\theta_t}{2}) & (1-\frac{\varepsilon_t}{2})\cos(\frac{\theta_t}{2}) \end{bmatrix} \begin{bmatrix} Xi \\ Xq \end{bmatrix}$$

In Eq. 1, $X_i$ and $X_q$ represent I and Q signal components of the complex tone signal respectively, $R_i$ and $R_q$ represent I and Q signal components of the received calibration signal respectively, $\varepsilon_t$ and $\varepsilon_r$ represent gain mismatch normalized to nominal gain for the transmitter 150 and the receiver 160 respectively, $\theta_t$ and $\theta_r$ represent phase mismatch in radians for the transmitter 150 and the receiver 160 respectively, $\phi$ represents an effective phase difference between receive and transmit local oscillator signals, while G represents loopback gain from the transmitter 150 to the receiver 160. Each of the received calibration signals (e.g., each of the four calibration signals) can be represented in the format of Eq. 1. The phase of the received calibration signals may vary depending on whether the digital I/Q phase mismatch and/or the analog phase shift is transmitted in the calibration signal. The flow continues at block 328.

At block 328, it is determined whether an analog to digital converter (ADC) in the receiver 160 saturates on receiving the received calibration signal. For example, the AGC 128 may comprise a processing unit that determines whether the ADC 126 saturates on receiving the received calibration signal. As another example, the error calibration and compensation unit 132 may analyze the output of the ADC 126 and determine whether the ADC 126 saturates. A pre-determined number of samples of the received calibration signal may be analyzed to determine whether the ADC 126 saturates. In one implementation, amplitude of or power in the pre-determined number of samples may be determined and may be compared against a saturation threshold. If it is determined that the ADC saturates, the flow continues at block 448 in FIG. 4. Otherwise, the flow continues at block 329 in FIG. 3.

At block 329, the receiver DC offset is corrected. The receiver DC offset may be subtracted from the received calibration signal. The flow continues at block 330.

At block 330, it is determined whether the receiver gain setting has changed or been initialized. For example, the AGC 128 in the receive chain processing units 122 may determine whether the receiver gain setting has changed or has been initialized. If it is determined that the receiver gain setting has changed or has been initialized, the flow continues at block 332 in FIG. 3 where a new receive gain setting is selected (e.g., by the AGC unit 128). Otherwise, the flow continues at block 440 in FIG. 4 and the AGC unit 128 is bypassed.

At block 332, a mean power of the received calibration signal is calculated. In one implementation, power over a pre-determined number of samples of the received calibration signal may be determined. The flow continues at block 434 in FIG. 4.

At block 434, it is determined whether the mean power of the received calibration signal is greater than an upper limit power threshold. For example, the gain of the receive chain processing units 116 may vary because of a mismatch in gain variations in the transmitter 150, ADC 126 saturation, etc. If it is determined the mean power of the received calibration signal is greater than the upper limit power threshold, the flow continues at block 448. Otherwise, the flow continues at block 436.

At block 448, the receiver gain setting is decreased. The flow 200 moves from block 434 to block 448 on determining that the mean power of the received calibration signal is greater than the upper limit power threshold. Additionally, the flow 200 moves from block 328 in FIG. 3 to block 448 in FIG. 4 on determining that the ADC 126 saturates on receiving the received calibration signal. For example, a new receiver gain setting may be determined based, in part, on a difference between the mean power of the received calibration signal and the upper limit power threshold. As another example, the new receiver gain setting may be determined by trial and error. The gain of mixer stages(s), filter stage(s), and/or other receive chain processing units 122 may also be decreased in accordance with the new receiver gain setting. The receive gain table 124 may indicate values by which to vary coefficients of the receive chain processing units 122 based on the new receiver gain setting. In one implementation, the gain of the receive chain processing units 122 may be decreased by 6 dB. In another implementation, the gain of the receive chain processing units 122 may be reduced by other suitable gain drop values. In response to determining that the mean power is greater than the upper-limit power threshold, calibration signals for the transmitter gain setting may be retransmitted with the new receiver gain setting to negate a difference between the mean power and a desired signal power. It is noted that in some implementations, if the receiver gain setting cannot be decreased (e.g., because the receiver gain setting is at a minimum gain setting), digital scaling gain may be decreased. The flow continues at block 452.

At block 452, calibration measurements for the current transmitter gain setting are discarded. For example, the error calibration and accumulation unit 132 discards any values of $I^2$, $Q^2$, $I*Q$ (provided by the correlation and accumulation unit 130) and DC estimate that were determined for the current transmitter gain setting. Additionally, a notification indicating that the current transmitter gain setting should not be changed may also be generated. The flow continues at block 208 in FIG. 2, where the current transmitter gain setting is maintained and calibration measurements (described above) are performed for a combination of the current transmitter gain setting and the new receiver gain setting.

At block 436, it is determined whether the mean power of the received calibration signal is less than a lower limit power threshold. The flow 200 moves from block 436 to block 440 on determining that the mean power of the received calibration signal does not fall below the lower limit power threshold. The lower limit power threshold may indicate a lowest acceptable value of power of the received calibration signal taking into consideration ADC quantization noise, etc. If it is determined the mean power of the received calibration signal is less than the lower limit power threshold, the flow continues at block 450. Otherwise, the receiver gain setting is not varied and the flow continues at block 440.

At block 450, either the receiver gain setting or the digital scaling gain is increased. For example, a new receiver gain setting may be determined based, in part, on a difference between the mean power of the received calibration signal and the lower limit power threshold. The gain of the mixer stage(s), the filter stage(s), and/or other receive chain processing units 122 may also be increased in accordance with the new receiver gain setting. The receive gain table 124 may be accessed to determine values by which to vary coefficients of the receive chain processing units 122 based on the new receiver gain setting. In some implementations, a control signal may also be generated to direct the error calibration and compensation 132 to discard previous calibration measurements associated with the current transmitter gain setting and to retransmit the calibration signals for the current transmitter gain setting. In some implementations, if the receiver gain setting cannot be increased (e.g., because the receiver gain is at a maximum setting), the digital scaling gain may be increased. The flow continues at block 452, where calibration measurements associated with the current transmitter gain setting are discarded in response to increasing the receiver gain setting.

At block 440, values of $I^2$, $Q^2$, $I*Q$, and DC value are measured ("measured values") for the received calibration signal. The measured values for the calibration measurement may be associated with the transmitter gain setting. The flow 200 moves from block 436 to block 440 on determining that the mean power of the received calibration signal is within acceptable limits and the receiver gain setting should not be varied. The flow 200 also moves from block 330 in FIG. 3 to block 440 in FIG. 4 on determining that the ADC 126 does not saturate and that the receiver gain setting should not be varied. On receiving the received calibration signal, the correlation and accumulation unit 130 can split the received calibration signal into its constituent components—a received complex tone signal and a received DC signal. The received complex tone signal and the received DC signal may be separated by integration and by subtracting an estimated DC signal from the received calibration signal. The error calibration and compensation unit 132 can calculate the values of $I^2$, $Q^2$, and $I*Q$ from the received complex tone signal and can also determine the DC value from the received calibration signal. These values can then be provided to the error calibration and compensation unit 132 to determine the transmitter carrier leak and I/Q mismatch The values of $I^2$, $Q^2$, and $I*Q$ for the received calibration signal (represented as $Ri^2$, $Rq^2$, and $Ri*Rq$ respectively) may be calculated as depicted in Eq. 2, Eq. 3, and Eq. 4, respectively.

$$Ri^2 = \frac{G^2}{2}[(1+\varepsilon_R) + \varepsilon_T\cos2\varphi - \theta_T\sin2\phi] \quad \text{Eq. 2}$$

$$Rq^2 = \frac{G^2}{2}[(1-\varepsilon_R) - \varepsilon_T\cos2\varphi + \theta_T\sin2\phi] \quad \text{Eq. 3}$$

$$Ri*Rq = \frac{G^2}{2}[\varepsilon_T\sin2\varphi + \theta_T\cos2\phi + \theta_R] \quad \text{Eq. 4}$$

As described above, if the analog phase shift ($\phi_{shift}$) is added to the loopback path, the terms in Eqs. 2-4 may be represented as ($\phi+\phi_{shift}$). If the digital I/Q phase mismatch ($\Delta\theta$) is applied to the calibration signal, the $\theta_T$ terms in Eqs. 2-4 may be represented as ($\Delta_T+\Delta\theta$). The flow continues at block 442.

At block 442, it is determined whether there exist additional calibration signals. As described above, a set of four calibration signals may be transmitted for each transmitter gain setting to calibrate transmitter I/Q mismatch and carrier leak. In some implementations, however, other suitable number of calibration signals may be transmitted to calibrate the transmitter I/Q mismatch and carrier leak. If it is determined that there exist additional calibration signals, the flow continues at block 212 in FIG. 2, where a digital complex tone signal for a next calibration signal is generated and transmitted. Otherwise, the flow continues at block 444.

At block 444, the values of $I^2$, $Q^2$, and $I*Q$ determined for each of the four calibration signals, at the transmitter gain setting, are processed to determine the transmitter I/Q mismatch. For example, the error calibration and compensation unit 132 may combine $I^2$, $Q^2$, and $I*Q$ determined for each of the four calibration signals to calibrate the transmitter I/Q mismatch. Eq. 5 represents the transmitter I/Q mismatch correction matrix while Eq. 6 represents the receiver I/Q mismatch correction matrix for correcting I/Q mismatch at the transmitter 150 and at the receiver 160 respectively.

$$tx_{iq_{corr}} = \begin{bmatrix} 1 - \frac{\varepsilon_t}{2} & \frac{-\theta_t}{2} \\ \frac{-\theta_t}{2} & 1 + \frac{\varepsilon_t}{2} \end{bmatrix} \quad \text{Eq. 5}$$

$$rx_{iq_{corr}} = \begin{bmatrix} 1 - \frac{\varepsilon_r}{2} & \frac{-\theta_r}{2} \\ \frac{-\theta_r}{2} & 1 + \frac{\varepsilon_r}{2} \end{bmatrix} \quad \text{Eq. 6}$$

Moreover, the transmitter I/Q mismatch correction matrix to be applied to correct for the transmitter I/Q mismatch may be associated with the transmitter gain setting. When the transmitter gain setting is applied to transmit RF signals (e.g., comprising data), transmitter I/Q mismatch corrections for the transmitter gain setting can be applied at the transmit I/Q correction unit 110. For example, the error calibration and compensation unit 132 may generate control signals to direct the transmit I/Q correction unit 110, the transmit chain processing units 116, etc. to compensate for the transmitter I/Q mismatch. The error calibration and compensation unit 132 may notify the transmit I/Q correction unit 110 of the I/Q mismatch parameters (e.g., gain mismatch, phase mismatch, phase difference between transmit and receive local oscillator signals, etc). In one implementation, the transmit I/Q correction unit 110 may comprise error correction circuitry (e.g., a combination of multipliers, adders, etc) that operate on the signal to be transmitted and apply the I/Q mismatch corrections to the signal to be transmitted. The flow continues at block 445. It is noted that in other implementations, the correction matrices depicted by Eqs. 5-6 can be further approximated and simplified to reduce the number of multipliers and adders required to apply the correction matrices.

At block 445, after removing the receiver DC component, the DC values determined from two of the four calibration signals are processed along with the receiver I/Q correction matrix, loopback phase rotation matrix, and transmitter I/Q correction matrix to estimate the carrier leak. For example, the error calibration and compensation unit 132 can preprocess two estimated DC values as depicted by Eq. 7.

$$\begin{bmatrix} DC_{corr_i} \\ DC_{corr_q} \end{bmatrix} = [tx_{iq_{corr}}] \cdot \begin{bmatrix} \cos\varphi & \sin\varphi \\ -\sin\varphi & \cos\varphi \end{bmatrix} [rx_{iq_{corr}}] \begin{bmatrix} DC_i \\ DC_q \end{bmatrix} \quad \text{Eq. 7}$$

An average of the two corrected DC values (denoted as $cl_i$ and $cl_q$ for the in-phase and quadrature phase) may be proportional to the carrier leak. The carrier leak correction $CL_{corr}$ is dependent on the correction order of the transmitter carrier leak and I/Q mismatch. To first correct the transmitter carrier leak followed by correcting the transmitter I/Q mismatch, the carrier leak correction $CL_{corr}$ can be approximately determined by Eq. 8.

$$\begin{bmatrix} CL_{corr_i} \\ CL_{corr_q} \end{bmatrix} = [tx_{iq_{corr}}]^{-1} \cdot \begin{bmatrix} cl_i \\ cl_q \end{bmatrix} \quad \text{Eq. 8}$$

To first correct the transmitter I/Q mismatch followed by correcting the transmitter carrier leak, the carrier leak correction $CL_{corr}$ can be approximately determined by Eq. 9

$$\begin{bmatrix} CL_{corr_i} \\ CL_{corr_q} \end{bmatrix} = \begin{bmatrix} cl_i \\ cl_q \end{bmatrix} \quad \text{Eq. 9}$$

The carrier leak can be associated with the transmitter gain setting and can be used to negate the carrier leak during normal transmissions. When the transmitter gain setting is applied to transmit RF signals, the carrier leak corrections can be applied by subtracting the carrier leak (e.g., DC offset) at the input of the DAC 112. In one implementation, the error calibration and compensation unit 132 may generate control signals to direct the transmit carrier leak correction unit 108 in the transmitter 150 to compensate for the carrier leak. The flow continues at block 446.

At block 446, it is determined whether there exists another transmitter gain setting. The transmit gain table 118 may be accessed to determine whether there exists another transmitter gain setting for which transmitter I/Q mismatch and carrier leak calibrations should be performed. If it is determined that there exists another transmitter gain setting, the flow continues at block 202 in FIG. 2, where a next transmitter gain setting is applied to the transmitter 150 and transmitter I/Q mismatch and carrier leak calibrations are performed as described above. Otherwise, the flow ends. In some implementations, after the joint transmitter I/Q mismatch and carrier leak calibrations have been completed for each transmitter gain setting, the error calibration and compensation unit 132 may open the loopback path between the transmitter 150 and receiver 160. The transceiver 100 may then enter a normal mode of operation for processing wireless traffic, i.e., the transmitter 150 transmitting RF signals and the receiver 160 receiving RF signals via a network (e.g., WLAN).

It should be understood that the depicted diagrams (FIGS. 1 through 4) are examples meant to aid in understanding embodiments and should not be used to limit embodiments or limit scope of the claims. Embodiments may perform additional operations, fewer operations, operations in a different order, operations in parallel, and some operations differently. For instance, although the calibration measurements can be used to calibrate the transmitter I/Q mismatch and the receiver I/Q mismatch, the receiver I/Q mismatch are based on a loopback receiver circuit, which may or may not comprise all the processing units in a normal receiver circuit. For example, the normal receiver circuit comprises a biquad filter, while the loopback receiver circuit may not. Therefore, in some implementations, only the transmitter I/Q mismatch associated with the transmitter gain setting may be stored.

Although FIGS. 1-4 describe one technique for estimating transmitter I/Q mismatch in conjunction with carrier leak calibration, in some implementations, other techniques for estimating transmitter I/Q mismatch may be implemented in conjunction with the carrier leak calibration. For example, I/Q mismatch calibration techniques may transmit an RF spur at an appropriate RF spur frequency into receive chain mixers, through the loopback path to calibrate the receiver I/Q mismatch first. Accordingly, transmitter I/Q mismatch parameters are determined based on knowledge of the receiver I/Q mismatch parameters. The transmitter carrier leak can then be calibrated based on the knowledge of transmitter and receiver I/Q mismatch parameters.

Although FIG. 2 describes varying receiver gain settings (and consequently gain of the receive chain processing units 122) in response to determining that the mean power is greater than the upper limit power threshold or less than the lower limit power threshold, embodiments are not so limited. In some implementations, instead of varying the receiver gain setting, digital scaling may be applied at the transmitter 150. For example, on determining that the mean power of the received calibration signal is greater than the upper limit power threshold, the digital scaling may be decreased so that the mean power of the received calibration signal lies within the upper limit and the lower limit power thresholds. Likewise, on determining that the mean power of the received calibration signal is less than the lower limit power threshold, the digital scaling may be increased so that the mean power is within the upper limit and the lower limit power thresholds. In some implementations, the receiver gain setting may be varied in addition to varying the digital scaling. In some implementations, the receiver gain setting may not be varied until digital gain of the transmitter can no longer be varied (e.g., a maximum digital gain is reached).

Lastly, it is noted that the joint transmitter I/Q mismatch and carrier leak calibration can be performed periodically, randomly, during pre-programmed time periods, and/or during idle time periods when the wireless communication device is not processing RF traffic. Furthermore, it is noted that the joint transmitter I/Q mismatch and carrier leak calibration processes described above with reference to FIGS. 1-4 can be repeated one or more times during a calibration mode until the desired calibration results have been achieved, e.g., until a desired error vector measurement (EVM) has been met.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
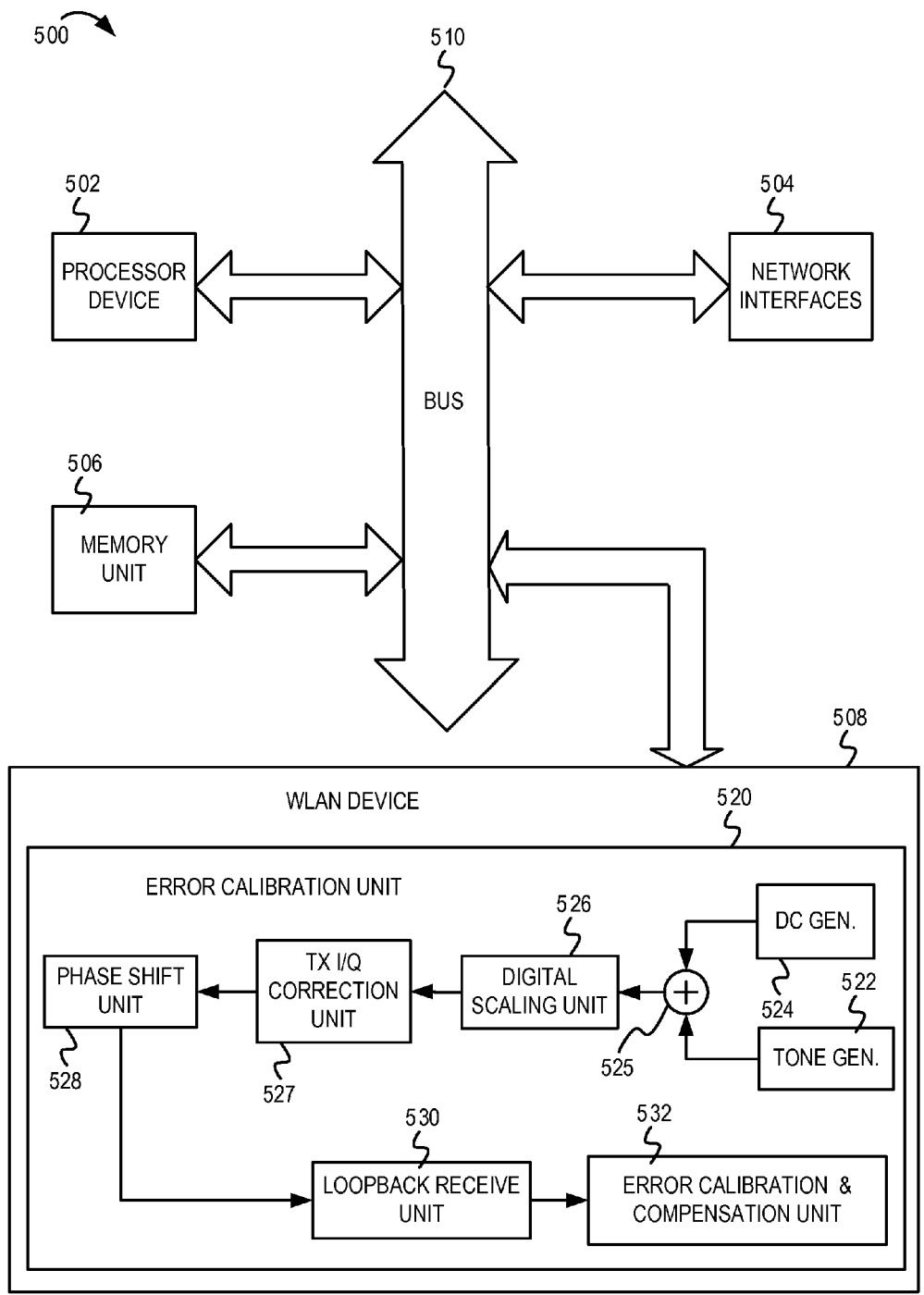
FIG. 5 is a block diagram of one embodiment of an electronic device including a mechanism for carrier leak and I/Q mismatch calibration.

FIG. 5 is a block diagram of one embodiment of an electronic device including a mechanism for joint transmitter I/Q mismatch and carrier leak calibration. In some implementations, the electronic device 500 may be one of a personal computer (PC), a laptop, a netbook, a mobile phone, a personal digital assistant (PDA), or other electronic systems comprising a WLAN device 520. The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, InfiniBand®, NuBus, etc.), and network interfaces 504 that include at least one wireless network interface (e.g., a WLAN interface, a Bluetooth® interface, a WiMAX interface, a ZigBee® interface, a Wireless USB interface, etc.).

The electronic device 500 also includes a WLAN device 508. The WLAN device 508 comprises an error calibration unit 520. The error calibration unit 520 comprises a tone generator 522, a DC generator 524, an adder 525, a digital scaling unit 526, a transmit I/Q correction unit 527, a phase shift unit 528, a loopback receive unit 530, and an error calibration and compensation unit 532. The error calibration unit 520 also comprises other processing components for performing joint transmitter I/Q mismatch and carrier leak calibration, as depicted in the transceiver 100 of FIG. 1. The tone generator 522, the DC generator 524, and the adder 525 generate multiple calibration signals that are transmitted through a loopback circuit for joint I/Q mismatch and carrier leak calibration. Prior to transmitting the calibration signals through the loopback path, the digital scaling unit 526 varies digital transmitter gain based on a predetermined transmitter gain setting. The transmit I/Q correction unit 527 applies a digital I/Q phase mismatch to the calibration signals. Also, the phase shift unit 528 applies an analog phase shift to the calibration signals for generation of multiple sets of calibration measurements to facilitate joint transmitter I/Q mismatch and carrier leak calibration, as described with reference to FIGS. 1-4. The loopback receive unit 530 receives and processes the calibration signal after the calibration signal passes through the loopback circuit. The error calibration unit 520 implements functionality for joint transmitter carrier leak and I/Q mismatch calibration as described with reference to FIGS. 1-4.

Any one of these functionalities may be partially (or entirely) implemented in hardware and/or software on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the storage device(s), and the network interface 504 are coupled to the bus 510. Although illustrated as being coupled to the bus 510, the memory 506 may be coupled to the processor unit 502.

While the embodiments are described with reference to various implementations and exploitations, it will be understood that these embodiments are illustrative and that the scope of the inventive subject matter is not limited to them. In general, techniques for joint transmitter I/Q calibration and carrier leak calibration as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    generating a plurality of digital complex tone signals and a plurality of direct current (DC) signals at a transmitter unit of a wireless network device;
    combining the plurality of digital complex tone signals and the plurality of DC signals to generate a plurality of calibration signals used for performing transmitter in-phase/quadrature (I/Q) mismatch and carrier leak calibration in the wireless network device;
    modifying one or more of the plurality of calibration signals based, at least in part, on a predefined digital I/Q phase mismatch;
    modifying one or more of the plurality of calibration signals based, at least in part, on an analog phase shift, wherein at least one of the plurality of calibration signals is modified using both the predefined digital I/Q phase mismatch and the analog phase shift;
    providing the plurality of calibration signals from the transmitter unit to a receiver unit of the wireless network device via a loopback path coupled between the transmitter unit and the receiver unit;
    processing the plurality of calibration signals to determine transmitter I/Q mismatch and carrier leak parameters for the transmitter unit; and
    programming the transmitter unit to compensate for transmitter I/Q mismatch and carrier leak based, at least in part, on the transmitter I/Q mismatch and carrier leak parameters.

2. The method of claim 1, further comprising:
    during a normal operational mode, pre-distorting signals that are processed by the transmitter unit based, at least in part, on the transmitter I/Q mismatch and the carrier leak parameters to compensate for I/Q mismatch and carrier leak at the transmitter unit.

3. The method of claim 1, wherein said combining the plurality of digital complex tone signals and the plurality of DC signals to generate the plurality of calibration signals further comprises superposing a first of the plurality of DC signals on a first of the plurality of digital complex tone signals.

4. The method of claim 3, wherein said superposing the first of the plurality of DC signals on the first of the plurality of digital complex tone signals further comprises adding the first of the plurality of DC signals on an in-phase signal component of the first of the plurality of digital complex tone signals.

5. The method of claim 1, wherein said processing the plurality of calibration signals to determine the transmitter I/Q mismatch and the carrier leak parameters for the transmitter unit further comprises:
    determining, at the receiver unit, a plurality of calibration measurements for corresponding each of the plurality of calibration signals; and
    calculating the transmitter I/Q mismatch and carrier leak parameters for the transmitter unit based, at least in part, on said determining the plurality of calibration measurements for corresponding each of the plurality of calibration signals.

6. The method of claim 5, wherein said determining, at the receiver unit, the plurality of calibration measurements for corresponding each of the plurality of calibration signals further comprises:
    extracting, at the receiver unit from a first of the plurality of calibration signals, a first of the plurality of digital complex tone signals and a first of the plurality of DC signals, wherein the first of the plurality of digital complex tone signals and the first of the plurality of DC signals constitute the first of the plurality of calibration signals;
    determining an in-phase signal component and an quadrature signal component based, at least in part, on the first of the plurality of digital complex tone signals; and
    determining a DC offset value base, at least in part, on the first of the plurality of DC signals.

7. The method of claim 6, wherein said calculating the transmitter I/Q mismatch and carrier leak parameters for the transmitter unit further comprises:

calculating the transmitter I/Q mismatch parameters for the transmitter unit based, at least in part, on said determining the in-phase signal component and the quadrature signal component; and calculating the carrier leak parameters for the transmitter unit based, at least in part, on said determining the DC offset value.

8. The method of claim 7, wherein said calculating the transmitter I/Q mismatch parameters for the transmitter unit comprises:

extracting, at the receiver unit, the plurality of digital complex tone signals from respective each of the plurality of calibration signals;

calculating, for each of the plurality of digital complex tone signals, a magnitude of an in-phase signal component, a magnitude of a quadrature signal component, and a product of the in-phase signal component and the corresponding quadrature signal component; and combining the magnitude of the in-phase signal component, the magnitude of the quadrature signal component, and the product of the in-phase signal component and the corresponding quadrature signal component for each of the plurality of digital complex tone signals to yield the transmitter I/Q mismatch parameters used for compensating for I/Q mismatch at the transmitter unit.

9. The method of claim 1, wherein the plurality of calibration signals, the transmitter I/Q mismatch parameters, and the carrier leak parameters are associated with a first of a plurality of transmitter gain settings and a first of a plurality of receiver gain settings.

10. The method of claim 9, further comprising maintaining the first of the plurality of receiver gain settings constant for the plurality of calibration signals associated with the first of the plurality of transmitter gain settings, and wherein said maintaining the first of the plurality of receiver gain settings constant further comprises applying digital scaling based, at least in part, on the first of the plurality of transmitter gain settings.

11. The method of claim 1, further comprising:

in response to receiving, at the receiver unit via the loopback path, at least a first of the plurality of calibration signals, determining that a receiver gain setting should be changed, wherein the receiver gain setting is indicative of a signal strength of the first of the plurality of calibration signals at the receiver unit;

identifying, from a plurality of receiver gain settings, a new receiver gain setting;

applying the new receiver gain setting to the receiver unit;

discarding at least the first of the plurality of calibration signals; and retransmitting the plurality of calibration signals from the transmitter unit to the receiver unit via the loopback path coupled between the transmitter unit and the receiver unit, to recalculate the transmitter I/Q mismatch and carrier leak parameters for the transmitter unit based, at least in part, on the new receiver gain setting.

12. The method of claim 11, wherein said determining that the receiver gain setting should be changed is in response to at least one of determining that an analog to digital converter in the receiver unit saturates, determining that a mean power of the first of the plurality of calibration signals is greater than an upper limit power threshold, and determining that the mean power of the first of the plurality of calibration signals is less than a lower limit power threshold.

13. The method of claim 11, further comprising varying digital scaling at the transmitter unit in response to at least one of determining that an analog to digital converter in the receiver unit saturates, determining that a mean power of the first of the plurality of calibration signals is greater than an upper limit power threshold, and determining that the mean power of the first of the plurality of calibration signals is less than a lower limit power threshold.

14. The method of claim 1, wherein the transmitter I/Q mismatch parameters comprise a transmitter phase mismatch parameter and a transmitter gain mismatch parameter.

15. The method of claim 1, wherein the plurality of calibration signals comprises four calibration signals, wherein said modify one or more of the plurality of calibration signals based, at least in part, on the predefined digital I/Q phase mismatch and said modify one or more of the plurality of calibration signals based, at least in part, on the analog phase shift comprises:

determining not to modify a first calibration signal using the predefined digital I/Q phase mismatch and the analog phase shift, determining to modify a second calibration signal using the predefined digital I/Q phase mismatch, determining to modify a third calibration signal using the analog phase shift, and determining to modify a fourth calibration signal using the predefined digital I/Q phase mismatch and the analog phase shift.

16. A wireless network device comprising:

a transmitter unit comprising:

a tone generator operable to generate a plurality of digital complex tone signals;

a direct current (DC) generator operable to generate a plurality of DC signals;

an adder operable to combine the plurality of digital complex tone signals and the plurality of DC signals to generate a plurality of calibration signals used for performing transmitter in-phase/quadrature (I/Q) mismatch and carrier leak calibration in the wireless network device;

a transmit I/Q correction unit operable to modify one or more of the plurality of calibration signals based, at least in part, on a predefined digital I/Q phase mismatch;

an analog phase shift unit operable to modify one or more of the plurality of calibration signals based, at least in part, on an analog phase shift, wherein at least one of the plurality of calibration signals is modified using both the predefined digital I/Q phase mismatch and the analog phase shift; and a receiver unit operable to receive the plurality of calibration signals from the transmitter unit via a loopback path coupled between the transmitter unit and the receiver unit, the receiver unit comprising:

an error calibration and processing unit operable to:

process the plurality of calibration signals to determine transmitter I/Q mismatch and carrier leak parameters for the transmitter unit; and program the transmitter unit to compensate for transmitter I/Q mismatch and carrier leak based, at least in part, on the transmitter I/Q mismatch and carrier leak parameters.

17. The wireless network device of claim 16, further comprising the error calibration and processing unit operable to:

during a normal operational mode, pre-distort signals that are processed by the transmitter unit based, at least in part, on the transmitter I/Q mismatch and the carrier leak parameters to compensate for I/Q mismatch and carrier leak at the transmitter unit.

18. The wireless network device of claim 16, wherein the adder operable to combine the plurality of digital complex tone signals and the plurality of DC signals to generate the plurality of calibration signals further comprises the adder operable to superpose a first of the plurality of DC signals on a first of the plurality of digital complex tone signals.

19. The wireless network device of claim 16, wherein the error calibration and processing unit operable to process the plurality of calibration signals to determine the transmitter I/Q mismatch and the carrier leak parameters for the transmitter unit further comprises:
    a correlation and accumulation unit operable to:
        determine, at the receiver unit, a plurality of calibration measurements for corresponding each of the plurality of calibration signals; and
    the error calibration and processing unit operable to:
        calculate the transmitter I/Q mismatch and carrier leak parameters for the transmitter unit based, at least in part, on the correlation and accumulation unit determining the plurality of calibration measurements for corresponding each of the plurality of calibration signals.

20. The wireless network device of claim 16, wherein the plurality of calibration signals, the transmitter I/Q mismatch parameters, and the carrier leak parameters are associated with a first of a plurality of transmitter gain settings and a first of a plurality of receiver gain settings.

21. The wireless network device of claim 20, further comprising the transmitter unit operable to maintain the first of the plurality of receiver gain settings constant for the plurality of calibration signals associated with the first of the plurality of transmitter gain settings, and wherein the transmitter unit operable to maintain the first of the plurality of receiver gain settings constant further comprises a digital scaling unit operable to apply digital scaling based, at least in part, on the first of the plurality of transmitter gain settings.

22. The wireless network device of claim 16, further comprising:
    the receiver unit comprising:
        an automatic gain control unit operable to:
            in response to the receiver unit receiving, via the loopback path, at least a first of the plurality of calibration signals, determine that a receiver gain setting should be changed, wherein the receiver gain setting is indicative of a signal strength of the first of the plurality of calibration signals at the receiver unit;
            identify, from a plurality of receiver gain settings, a new receiver gain setting;
            apply the new receiver gain setting to the receiver unit; and
        the error calibration and compensation unit operable to:
            discard at least the first of the plurality of calibration signals;
        the transmitter unit operable to:
            retransmit the plurality of calibration signals to the receiver unit via the loopback path coupled between the transmitter unit and the receiver unit, to recalculate the transmitter I/Q mismatch and carrier leak parameters for the transmitter unit based, at least in part, on the new receiver gain setting.

23. The wireless network device of claim 22, further comprising the automatic gain control unit operable to adjust the receiver gain setting to maintain the signal strength of the first of the plurality of calibration signals within a predefined signal strength range.

24. One or more non-transitory machine-readable storage media, having instructions stored therein, which, when executed by one or more processors causes the one or more processors to perform operations that comprise:
    generating a plurality of digital complex tone signals and a plurality of direct current (DC) signals at a transmitter unit of a wireless network device;
    combining the plurality of digital complex tone signals and the plurality of DC signals to generate a plurality of calibration signals used for performing transmitter in-phase/quadrature(I/Q) mismatch and carrier leak calibration in the wireless network device;
    modify one or more of the plurality of calibration signals based, at least in part, on a predefined digital I/Q phase mismatch;
    modify one or more of the plurality of calibration signals based, at least in part, on an analog phase shift, wherein at least one of the plurality of calibration signals is modified using both the predefined digital I/Q phase mismatch and the analog phase shift;
    providing the plurality of calibration signals from the transmitter unit to a receiver unit of the wireless network device via a loopback path coupled between the transmitter unit and the receiver unit;
    processing the plurality of calibration signals to determine transmitter I/Q mismatch and carrier leak parameters for the transmitter unit; and
    programming the transmitter unit to compensate for transmitter I/Q mismatch and carrier leak based, at least in part, on the transmitter I/Q mismatch and carrier leak parameters.

25. The machine-readable storage media of claim 24, wherein said operation of processing the plurality of calibration signals to determine the transmitter I/Q mismatch and the carrier leak parameters for the transmitter unit further comprises:
    determining, at the receiver unit, a plurality of calibration measurements for corresponding each of the plurality of calibration signals; and
    calculating the transmitter I/Q mismatch and carrier leak parameters for the transmitter unit based, at least in part, on said operation of determining the plurality of calibration measurements for corresponding each of the plurality of calibration signals.

26. The machine-readable storage media of claim 24, wherein the plurality of calibration signals, the transmitter I/Q mismatch parameters, and the carrier leak parameters are associated with a first of a plurality of transmitter gain settings and a first of a plurality of receiver gain settings.

27. The machine-readable storage media of claim 26, wherein the operations further comprise maintaining the first of the plurality of receiver gain settings constant for the plurality of calibration signals associated with the first of the plurality of transmitter gain settings, and wherein said operation of maintaining the first of the plurality of receiver gain settings constant further comprises applying digital scaling based, at least in part, on the first of the plurality of transmitter gain settings.

* * * * *